United States Patent [19]

Kuo

[11] Patent Number: 4,711,803
[45] Date of Patent: Dec. 8, 1987

[54] MEGOHM RESISTOR PAINT AND RESISTORS MADE THEREFROM

[75] Inventor: Charles C. Y. Kuo, Elkhart, Ind.

[73] Assignee: CTS Corporation, Elkhart, Ind.

[21] Appl. No.: 768,058

[22] Filed: Aug. 22, 1985

Related U.S. Application Data

[63] Continuation-in-part of Ser. No. 750,029, Jul. 1, 1985.

[51] Int. Cl.$^4$ .................. H01B 1/06; H01C 7/10; B32B 17/06
[52] U.S. Cl. .................... 428/209; 252/518; 428/901; 428/328; 428/404
[58] Field of Search ............. 428/432, 901, 209, 210, 428/328, 404; 252/518

[56] References Cited

U.S. PATENT DOCUMENTS

| | | | |
|---|---|---|---|
| 3,598,761 | 8/1971 | Woulbroun et al. | 252/514 |
| 3,776,772 | 12/1973 | Asada et al. | 117/227 |
| 4,041,436 | 8/1977 | Kouchich et al. | 428/432 X |
| 4,065,743 | 12/1977 | Wahlers et al. | 338/308 |
| 4,130,671 | 12/1978 | Nagesh et al. | 427/125 |
| 4,172,922 | 10/1979 | Meiz et al. | 428/432 |
| 4,215,020 | 7/1980 | Wahlers et al. | 252/519 |
| 4,293,838 | 10/1981 | Wahlers et al. | 338/308 |
| 4,354,964 | 10/1982 | Hing et al. | 252/518 |
| 4,378,409 | 3/1983 | Wahlers et al. | 428/432 |
| 4,397,915 | 8/1983 | Wahlers et al. | 428/432 |
| 4,439,352 | 3/1984 | Asada et al. | 428/432 X |

FOREIGN PATENT DOCUMENTS 812858 3/1957 United Kingdom.
1511601 5/1978 United Kingdom.

OTHER PUBLICATIONS

"Electrical Applications of Thin-Films Produced by Metallo-Organic Deposition," C. Y. Kuo, Solid State Technology, Feb. 1974.

*Primary Examiner*—Nancy Swisher
*Attorney, Agent, or Firm*—Rodger H. Flagg

[57] ABSTRACT

A thick film resistor paint is disclosed, wherein a base metal powder, such as tin oxide powder, is coated with a resinate solution, such as an Mn resinate solution, and the resinate coated powder thus formed is prefired in a reducing atmosphere to form a pre-reacted conductive powder. The pre-reacted conductive powder is then mixed with a glass frit, an oxide of hafnium, and a screening agent to form a thick film resistive paint having a sheet resistivity of from 500,000 ohms to 5 megohms per square. The resistive paint is subsequently screened upon a substrate and fired in an inert atmosphere, preferably at 900° C.±20° C., to form a thick film base metal resistor exhibiting a combined TCR within ±200 ppm/°C. The glass frit is preferably a tantala glass frit.

14 Claims, 12 Drawing Figures

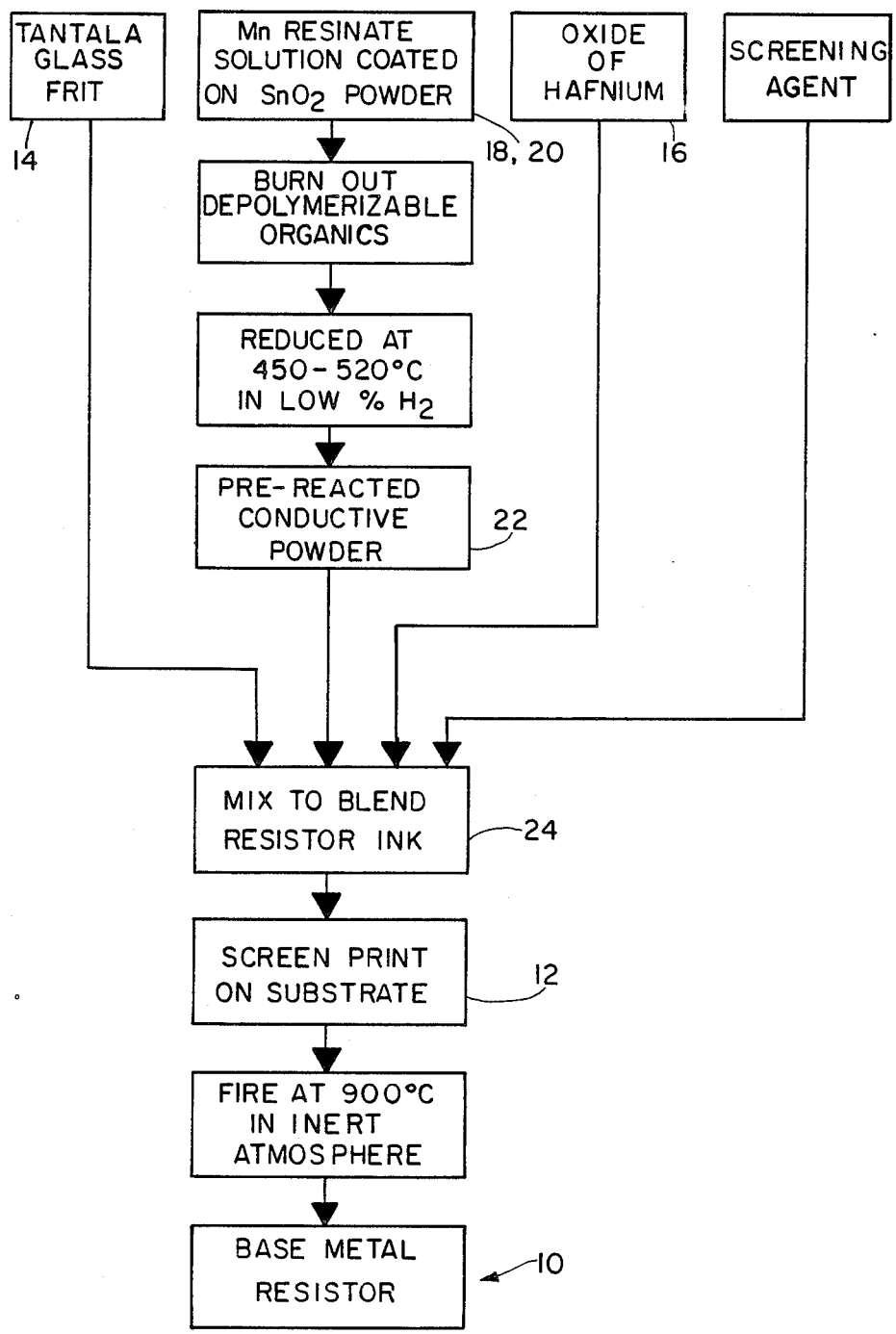

Ω/□ VS FIRING TEMPERATURE

FIRING TEMPERATURE °C

TCR VS FIRING TEMPERATURE

FIRING TEMPERATURE °C

Ω/□ VS BELT SPEED
(INFRARED FIRING, 900°C $N_2$)

BELT SPEED IN/MIN.

TCR VS BELT SPEED
(INFRARED FIRING, 900°C. $N_2$)

BELT SPEED, IPM

MEGOHM RESISTOR PAINT AND RESISTORS MADE THEREFROM

This application is a continuation-in-part of co-pending application Ser. No. 06/750,029, filed July 1, 1985 entitled "Pre-Reacted Resistor Paint and Resistors Made Therefrom," and the subject matter of the aforementioned co-pending application is incorporated by reference herein.

TECHNICAL FIELD

The present invention relates to base metal resistive paint, resistors made from the resistive paint, and methods for making the resistive paint. More particularly, this invention relates to coating a base metal powder with a resinate solution and firing in a reducing atmosphere to form a pre-reacted conductive powder for mixing with a glass frit, a screening agent and an oxide of hafnium, for subsequent screening onto a substrate and firing in an inert atmosphere to form a base metal resistor therefrom, in a range from 500,000 ohms to 5 megohms per square, with a TCR within ±200 ppm/°C.

BACKGROUND ART

In the past, it has proved difficult to blend a thick film resistor paint having sheet resistivity in the megohm per square range, that also exhibited TCR in the range of ±200 ppm/°C., and thermal stability of less than 0.25%. Palladium or plladium oxide (with or without silver) has been used to make resistors yielding good resistance properties only in the 10K to 100K ohms/square range.

Three alternate approaches have been used with ruthenium oxide resistors to raise the resistance properties of the resistor paint to the megohm range. One approach was to add more glass frit. A second approach was to mix inert materials with a higher melting point than the glass frit used. The third approach was to add sufficient semiconductive materials to the resistor paint to raise the resistance properties into the megohm range.

These three approaches were only partially successful; resulting in interface problems, increased surface roughness, poor thermal stability, high short time overload, and excessively negative TCR.

KNOWN PRIOR ART

In addition to the prior art referenced in the parent application referenced herein, Wahler's U.S. Pat. No. 4,293,838 discloses the use of an oxide of zirconium to raise sheet resistivity.

DISCLOSURE OF THE INVENTION

While Tin Oxide powder ($SnO_2$) has been used by admixture as a conductive powder, the present invention discloses coating a base metal powder, such as $SnO_2$ powder with a resinate solution, such as a Manganese (Mn) resinate solution, and firing the resinate coated base metal powder in a reducing atmosphere at 450°–520° C. to form a pre-reacted conductive powder. By mixing the pre-reacted conductive powder with a glass frit, a screening agent, and an oxide of hafnium, a megohm resistive paint or ink is mixed, exhibiting improved controllability of sheet resistivity and TCR over a range from 500,000 ohms/square to 5 megohms/square. Over the entire range, the TCR is held within ±200 ppm/°C., and thermal stability is held within 0.25%.

Therefore, what is needed is an inexpensive base metal resistor paint exhibiting a controlled sheet resistivity from 500K to 5 megohms per square, and a TCR within ±200 ppm/°C.

One object of this invention is to provide an improved base metal resistive paint suitable for secreening and firing on a substrate to form a megohm resistor thereon.

Another object is to provide a resistive paint mixed from a pre-reacted conductive powder; a glass frit, an oxide of hafnium, and a screening agent.

Another object is to provide a pre-reacted conductive powder by coating the base metal powder with a resinate solution, such as an Mn resinate solution; preheating the coated powder to form a pre-reacted conductive powder, and blending the pre-reacted conductive powder thus formed with a glass frit, an oxide of hafnium, and a screening agent to form a resistor paint therefrom, having a sheet resistivity from 500,000–5 megohms per square.

Yet another object is to burn off the depolymerizable organics coated upon the pre-reacted conductive powder prior to firing.

Still another object is to provide an improved resistor made from a resistive paint embodying any combination of the objects previously disclosed.

The above mentioned and other features and objects of this invention and the manner of attaining them will be best understood by reference to the following description of an embodiment of the invention, when considered in conjunction with the accompanying drawings.

BRIEF DESCRIPTION OF THE DRAWINGS

FIG. 2 shows a flow chart of the preferred base metal resistive paint having a sheet resistivity of 500,000 ohms to 5 megohms per square.

BEST MODE FOR CARRYING OUT THE INVENTION

Figure 1A:
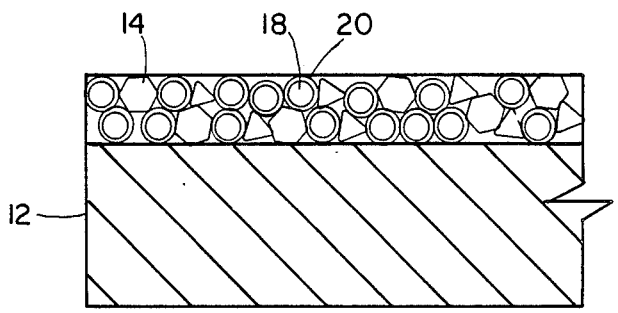
FIG. 1A shows an enlarged cross-sectional view of an admixture of glass frit, a pre-reacted conductive powder, an oxide of hafnium, and a screening agent, blended to form a resistor paint and screened upon a substrate prior to firing.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1A shows an enlarged cross-sectional view of a resistor paint or ink 24 of the present invention screened upon a substrate 12, prior to firing.

Figure 1B:
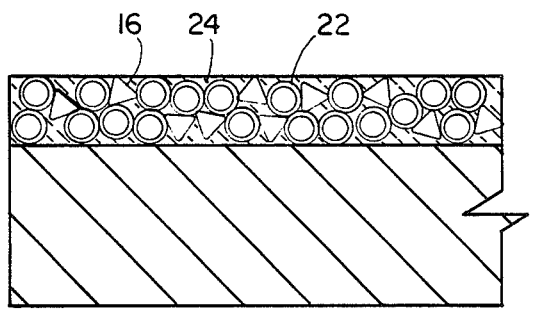
FIG. 1B shows an enlarged cross-sectional view of the admixture of FIG. 1 after firing.

FIG. 1B shows an enlarged cross-sectional view of the pre-reacted resistor paint 24 of the present invention after firing. The uniform coating of a resinate solution 20, such as a Manganese (Mn) resinate solution upon the base metal powder 18, such as a Tin Oxide ($SnO_2$) powder, provides uniform consistency throughout the pre-reacted resistive paint 24, providing improved performance characteristics, such as controlled sheet resistivity, lower TCR, uniformity of coefficient of variance (C.V.) and improved noise levels, as disclosed in the parent application referenced herein The high resistive values disclosed in the parent application are herein blended with an oxide of hafnium 16, to increase the sheet resistance into a preferred range from 500,000 ohms to 5 megohms per square, while the TCR remains in the preferred ±200 ppm/°C. range.

The preferred firing temperature of 900° C.±20° C. is lower than the conventional 1,000° C. firing temperatures used with most base metal resistors, resulting in reduced furnace maintenance and improved energy savings.

In the present invention, all compositions are given by weight percentage. The preferred pre-reacted resistive paint 24 is made by coating a base metal conductive powder 18, such as $SnO_2$, with a resinate solution 20, such as an Mn solution; firing the resinate coated conductive powder in a reducing atmosphere at 450°–520° C. to form a pre-reacted conductive powder 22; mixing the pre-reacted conductive powder 22 with a glass frit 14, a screening agent 26, and an oxide of hafnium 16 to form a pre-reacted resistive paint 24 for subsequent screening onto a substrate 12, and firing the screened substrate 30 at 900° C.±20° C. in an inert atmosphere to form a base metal resistor 10 therefrom.

The pre-reacted conductive powder 22, glass frit 14, oxide of hafnium 16 and screening agent 26 are preferably processed through a three roll mill to yield a consistent paint 24 for easy screening. The preferred particle size of the resistive paint 24 is less than 15 microns.

Screening agents typically comprise a solvent, a bonding agent and a wetting agent. The preferred screening agent is an organic compound, that leaves no carbon residue after firing in a nitrogen atmosphere. The resistor paint typically comprises 72% powder with 28% screening agent.

The solvent may be a pine oil, terpinel, an ester alcohol of Texanol from Texas Eastman Co., butyl carbitol acetate, or the like.

The resins used for a bonding agent are preferably polyalkylmethacrylate from DuPont or Rohm and Haas, or polybutenes, such as Amoco H-25, Amoco H-50 or Amoco L-100 from Amoco Chemicals Corporation. A wetting agent is sometimes added to the screening agent 26 to aid in wetting the pre-reacted conductive powder 22 and oxide of hafnium 16 for improved paint rheology.

The mixed resistor paint 24 is subsequently screened upon a substrate 12 prior to firing, to form a designated resistor pattern on substrate 12, such as a ceramic substrate. The resistive paint 24 is preferably screened through a 200 mesh stainless steel screen with 0.5 mil emulsion.

Copper conductives on the substrate were prefired at 900° C.±20° C. in a nitrogen atmosphere. The screened resistor paint was dried at 100°–125° C. in air for 15 to 30 minutes. The dried resistor paint 24 was then fired in a belt furnace at 900°±20° C. peak temperature for approximately 3–10 minutes in an inert atmosphere. The oxygen content in the belt furnace was less that 15 ppm. The metal content in the resinate solution 20 is preferably less than 30%. The oxide of hafnium is preferably from 2 to 12% by weight of resistor paint 24.

As disclosed in the parent application referenced herein, the pre-reacted conductive powder 22 was processed by the following steps:

(a) dilute the Mn resinate solution 20 in a low boiling point solvent, such as acetone, xylene or benzene to form a homogenous solution;

(b) add the homogenous solution to a base metal conductive powder 18 in sufficient quantity to cover the conductive powder;

(c) dry the resinate coated powder at a temperature sufficient to burn off the depolymerizable organics, at a temperature from 300° C. to 550° C.;

(d) grind and sift the dried resinate coated powder to a particle size of less than 10 microns; and (e) fire the dried resinate coated powder in a reducing atmosphere at 450°–520° C. for sufficient time to make an oxygen deficient semiconductor. In the following examples the equipment used for reducing the coated conductive powder was a tube furnace with a quartz or metal tube. The reducing gas was a low percentage hydrogen mixture, such as 7%$H_2$/93%$N_2$. A boat or a rotational tube with a screw type or belt advancement may also be used for automatic processing. A continuous process, such as a rotational tube will yield more consistent results than obtainable from a stationary boat setup.

FIG. 2 shows a flow chart for blending a base metal resistor paint having a sheet resistivity in a range from 500,000 ohms to 5 megohms per square, with a TCR within ±200 ppm/°C.

Referring now to FIG. 2, the megohm resistor paint herein disclosed comprises a pre-reacted conductive powder 22 formed by coating a base metal conductive powder 18, such as $SnO_2$ powder, with a resinate solution 20, such as an Mn resinate solution. Any depolymerizable organics present in the resinate coated conductive powder 18, 20 are then burned out to obtain the preferred resinate conductive powder. The resinate coated conductive powder is then fired in a reducing atmosphere, preferably at 450°–520° C., to produce the pre-reacted conductive powder 22.

The pre-reacted conductive powder 22 is blended with a glass frit 14, an oxide of hafnium 16, and a screening agent 26 to mix the megohm resistor paint 24.

The mixed resistor paint 24 is subsequently screened upon a substrate 12 to form a resistive pattern thereon. The screened substrate is then fired at 900° C.±20° in an inert atmosphere to form base metal resistor 10.

The glass frit is preferably a tantala glass frit. The preferred tantala glass frit comprises a mixture of glass powders of from 2-10% $SiO_2$; 20-40% SrO and 50-70% $B_2O_3$, or their percursors. The mixture is preferably melted at about 1,200° C. and ball milled to form a fine powder. Then 60-80% of the glass powder so mixed is blended with 20-40% $Ta_2O_5$ and the combined mixture is melted at about 1,200° C. and then ground to form a homogeneous tantala glass frit. The glass frit used in examples 1-10 comprised 5% $SiO_2$; 35% SrO and 60% $B_2O_3$. The glass frit of examples 1-10 was blended at a ratio of 80% glass frit with 20% $Ta_2O_5$ to make the tantala glass frit.

In Example 1 shown in Table 1, a 2.5% Mn resinate coated $SnO_2$ powder was dried at 600° C. and fired in a reducing atmpshere at 520° C. for approximately 30 minutes, to form a preheated conductive powder. 54% of the pre-reacted conductive pwoder and 18% tantala glass frit was mixed with 28% screening agent to bend the resistive paint of Example 1. The resistor paint was printed through a stainless steel screen with a designated resistor pattern on a ceramic substrate. The resistor paint was dried at 100°-125° C. in air for 15 to 30 minutes. The dried resistor paint was fired in a belt furnace at 900° C. peak temperature for about five minutes in an inert atmosphere. The oxygen content in the belt furnace was less than 15 ppm.

TABLE I

Comparison of additives of $ZrO_2$ and $HfO_2$

| Resistive Paint | Sheet Resistivity ohms/sq. | TCR, ppm/°C. Cold | TCR, ppm/°C. Hot | Thermal Stability % | % Additives in the Paint |
|---|---|---|---|---|---|
| Ex. 1 (No additives) | 233K | 215 | 120 | 0.19 | 0 |
| Ex. 2 (0.25 g $ZrO_2$) | 500K | 362 | 227 | 0.277 | 4.8% |
| Ex. 3 (0.35 g $ZrO_2$) | 457K | 372 | 253 | 0.265 | 6.5% |
| Ex. 4 (0.5 g $ZrO_2$) | 439K | 360 | 192 | 0.330 | 9% |
| Ex. 5 (0.75 g $ZrO_2$) | 436K | 275 | 137 | 0.410 | 13% |
| Ex. 6 (0.1 g $HfO_2$) | 776K | 234 | 160 | 0.14 | 2% |
| Ex. 7 (0.25 g $HfO_2$) | 1 meg | 173 | 122 | 0.15 | 4.8% |
| Ex. 8 (0.35 g $HfO_2$) | 1.5 meg | 142 | 49 | 0.10 | 6.5% |
| Ex. 9 (0.5 g $HfO_2$) | 2.0 meg | 70 | −33 | 0.14 | 9% |
| Ex. 10 (0.75 g $HfO_2$) | 2.7 meg | −80 | −244 | 0.30 | 13% |

In Example 1, no additives were added to the (3:1) resistive paint, previously disclosed.

In Example 2, 5 g of the resistive paint of Example 1 was blended with 0.25 g of $ZrO_2$, for purposes of comparison.

In Example 3, 5 g of the resistive paint of Example 1 was blended with 0.35 g of $ZrO_2$, for purposes of comparison.

In Example 4, 5 g of the resistive paint of Example 1 was blended with 0.5 g of $ZrO_2$, for purposes of comparison.

In Example 5, 5 g of the resistive paint of Example 1 was blended with 0.75 g of $ZrO_2$, for purposes of comparison.

As shown in Table 1, Examples 1 through 5, the addition of a greater quantity of $ZrO_2$ did not substantially increase the sheet resistivity, or improve the thermal stability of the resistive paint.

In Example 6, 5 g of the resistive paint of Example 1 was blended with 0.1 of the $HfO_2$.

The use of $ZrO_2$ additives in Examples 2 through 5 and 15, 16 are not part of the preferred invention. $ZrO_2$ additives are included for comparison with the preferred oxide of hafnium additive. The oxide of hafnium additive used in Examples 6 through 10, 12, 13, 17, 20, 22 and 23 was $HfO_2$.

In Example 7, 5 g of the resistive paint of Example 1 was blended with 0.25 g of $HfO_2$.

In Example 8, 5 g of the resistive paint of Example 1 was blended with 0.35 g of $HfO_2$.

In Example 9, 0.5 g of the resistive paint of Example 1 was blended with 0.5 g of $HfO_2$.

In Example 10, 0.5 g of the resistive paint of Example 1 was blended with 0.75 g of $HfO_2$.

Examples 6 through 10 show a dramatic increase in sheet resistivity from 776K to 2.7 megohms as $HfO_2$ is increased from 0.1 g to 0.75 g. Note that both hot and cold TCR remain largely within the preferred ±200 ppm/°C., and thermal stability remained at or below 0.15% in Examples 6 through 9.

If the resistive paint disclosed herein is carefully controlled, TCR's within ±100 ppm/°C. may be obtained, as noted by Example 9.

Preferably thermal stability is maintained within 0.25%, which is readily obtainable by the addition of $HfO_2$ as noted in Examples 6 through 9. Thus, it is noted that the preferred percentage of $HfO_2$ is from 2 to 12%, by weight, of the resistive paint.

In Table II, Examples 11 through 13, the same mixture of glass powder, i.e. 5% $SiO_2$; 35% SrO and 60% $B_2O_3$ was melted and ground as previously disclosed. Then 71.5% of this glass powder was blended with 28.5% of $Ta_2O_5$ to make the tantala glass frit. 51.4% of the pre-reacted conductive powder and 20.6% of the tantala glass frit was then mixed with 28% screening agent to blend the resistive paint of Example 11 (2.5 to 1 ratio).

TABLE II

Resistor Properties

| Resistive Paint | Sheet Resistivity ohms/sq. | TCR, ppm/°C. Cold | TCR, ppm/°C. Hot | Thermal Stability % |
|---|---|---|---|---|
| Ex. 11 (No additives) | 460K | 141 | 59 | 0.134 |
| Ex. 12 (.25 g $HfO_2$) | 2.7 meg | 69 | −12 | 0.097 |
| Ex. 13 (0.5 g $HfO_2$) | 3.2 meg | 17 | −70 | 0.012 |

In Example 11, no additives were added to the (2.5 to 1) resistive paint disclosed above.

In Example 12, 5 g of the resistive paint of Example 11 was blended with 0.25 g of $HfO_2$.

In Example 13, 5 g of the resistive paint of Example 11 was blended with 0.5 g with $HfO_2$.

As shown in Examples 11 through 13, the sheet resistivity is increased from 460K ohms to 3.2 megohms, while maintaining excellent hot and cold TCR as well as holding thermal stability well below 0.15%. The $HfO_2$ powder additive in Examples 12 and 13 ranged from 4.5 to 9%.

In Table III, Examples 14 through 18, a 1.7% Mn resinate coated $SnO_2$ conductive powder was prepared as previously disclosed in Example 1. (Note that Examples 1 through 13 contained 2.5% Mn resinate coated $SnO_2$ conductive powder).

TABLE III

| Additives | Resistor Properties | | | | |
|---|---|---|---|---|---|
| | Sheet Resistivity ohms/sq. | TCR, ppm/°C. Cold | Hot | Thermal Stability % | % Additive in the Paint |
| Ex. 14 | 0 | 330K | 129 | −28 | 0.11 | 0 |
| Ex. 15 | 0.25 g $ZrO_2$ | 1.2 meg. | 250 | 88 | 0.12 | 4.8 |
| Ex. 16 | 0.5 g $ZrO_2$ | 1.1 meg. | 230 | 89 | 0.15 | 9 |
| Ex. 17 | 0.25 g $HfO_2$ | 3.8 meg. | 83 | −72 | 0.10 | 4.8 |
| Ex. 18 | 0.5 g $HfO_2$ | 4.0 meg. | 44 | −165 | 0.007 | 9 |

In Example 14, no additives were added to the 1.7% Mn resinate coated $SnO_2$ resistive paint referenced above.

In Example 15, 5 g of the resistive paint of Example 14 was blended with 0.25 g of $ZrO_2$, for purposes of comparison.

In Example 16, 5 g of the resistive paint of Example 14 was blended with 0.5 g of $ZrO_2$, for purposes of comparison.

In Example 17, 5 g of the resistive paint of Example 14 was blended with 0.25 g of $HfO_2$.

In Example 18, 5 g of the resistive paint of Example 14 was blended with 0.5 g of $HfO_2$.

The addition of $ZrO_2$ in Examples 15 and 16 raised the sheet resistivity into the one megohm range, but the cold TCR exceeded ±200 ppm/°C.

The addition of $HfO_2$ in Examples 17 and 18 raised the sheet resistivity into the four megohm range, while keeping both hot and cold TCR well within ±200 ppm/°C. Note that thermal stability was also held within the desired parameters.

In Table IV, a 0.4% Ta resinate and a 0.4% Mn resinate solution was coated on the $SnO_2$ powder to make the resinate coated $SnO_2$ powder. The resinate coated $SnO_2$ powder was dried at 600° C. in air and reduced at 500° C. for 30 minutes in a 7% $H_2$/93% $N_2$ atmosphere, to make the pre-reacted conductive powder used in Examples 19 and 20. The resistive paint of Example 19 was blended in the ratio of 75% pre-reacted conductive powder to 25% tantala glass frit, a 3 to 1 ratio.

TABLE IV

| Additive | Resistor Properties | | | |
|---|---|---|---|---|
| | Sheet Resistivity ohms/sq. | TCR, ppm/°C. Cold | Hot | Thermal Stability % |
| Ex. 19 | 0 | 200K | 100 | −70 | 0.18 |
| Ex. 20 | .025 g $HfO_2$ | 1.9 meg | 168 | 43 | 0.19 |

In Example 19, no additional additives were added to the resistive paint disclosed above.

In Example 20, 0.25 g of $HfO_2$ was added to 5 g of the resistive paint of Example 19. This raised the sheet resistivity from 200K to 1.9 megohms, while the TCR remained within ±200 ppm/°C. and the thermal stability was below 0.2%.

In Table V, the same pre-reacted conductive powder used in Example 19, i.e. a 0.4% Ta and 0.4% Mn resinate solution was coated on the $SnO_2$ powder and the resinate coated $SnO_2$ was pre-fired as previously disclosed to make the pre-reacted conductive powder, used in Example 21. However, in Example 21, the ratio of pre-reacted conductive powder of tantala glass frit was changed to a ratio of 2.5 to 1, or 71.5% pre-reacted conductive powder to 28.5% tantala glass frit.

TABLE V

| Additive | Resistor Properties | | | |
|---|---|---|---|---|
| | Sheet Resistivity ohms/sq. | TCR, ppm/°C. Cold | Hot | Thermal Stability % |
| Ex. 21 | 0 | 389K | −38 | −139 | 0.14 |
| Ex. 22 | 0.25 g $HfO_2$ | 1.9 meg | −1 | −72 | 0.16 |
| Ex. 23 | 0.50 g $HfO_2$ | 2.65 meg | −80 | −117 | 0.15 |

In Example 21, no additional additives were added to the resistive paint disclosed above.

In Example 22, 5 g of the resistive paint of Example 21 was blended with 0.25 g of $HfO_2$.

In Example 23, 5 g of the resistive paint of Example 21 was blended with 0.5 g of $HfO_2$.

As shown in Table V, Examples 21 through 23, the sheet resistivity was raised into the megohm range, while the TCR's and thermal stability remained well within desirable limits.

The resistive paint disclosed herein remains less sensitive to processing conditions than observed with most ruthenium based resistor paints. The effect of firing temperatures, firing times, belt speed and number of firings are disclosed in FIGS. 4 through 7.

Figure 4A:
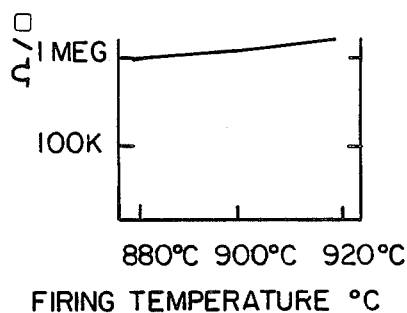
FIG. 4A shows the effect of firing temperature on sheet resistivity in ohms per square.

FIG. 4A shows the effect of firing temperature from 880° C. to 920° C. on sheet resistivity. Sheet resistivity remains within ±10%.

Figure 4B:
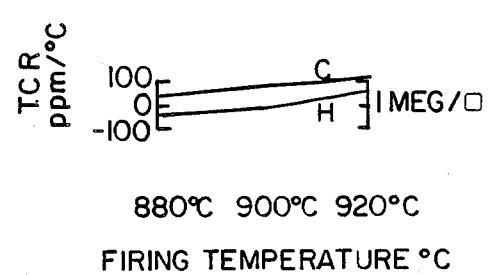
FIG. 4B shows the effect of firing temperature on TCR.

FIG. 4B shows the effect of firing temperature on TCR in ppm/°C. In the preferred 900° C. ±20° C. temperature range the TCR remains within ±200 ppm/°C.

Figure 5A:
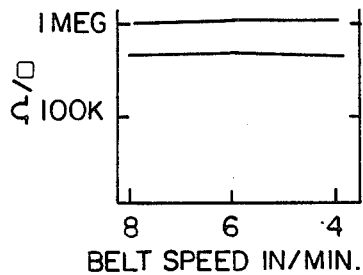
FIG. 5A shows the effect of belt speed in inches per minute on sheet resistivity in ohms per square.
Figure 5B:
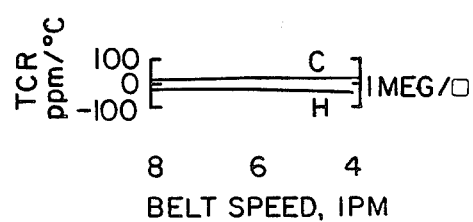
FIG. 5B shows the effect of belt speed in inches per minute on TCR in ppm/°C.

FIGS. 5A and 5B show the effect of belt speed in inches per minute on sheet resistivity and TCR during infrared firing at 900° C. in an inert atmosphere. It should be noted that some precious metal thick film resistor paints yield radically different properties when fired in an infrared furnace as opposed to conventional firing. The benefits of infrared firing include energy savings, fast heating and cooling time, fast output rate and space savings. An infrared furnace is easy to repair and costs about the same as a conventional furnace. The resistor paints disclosed herein yield consistent results when fired in an infrared furnace.

As shown in FIG. 5A, a change in belt speed from four inches per minute to eight inches per minute did not significantly alter the sheet resistivity in ohms per square. At four inches per minute, the resistor paint was heated for 36 minutes. At six inches per minute, the resistor paint was heated for 24 minutes. At eight inches per minute, the resistor paint was heated for 18 minutes. The test infrared heating zone was five feet long, with a seven foot long cooling zone. The 900° C. peak firing temperature was set in the middle two zones in a four zone IR furnace. The oxygen content in the furnace was less that 15 ppm.

As shown in FIG. 5B, the effect of belt speed on TCR remained well within ±100 ppm/°C., over the selected range.

Figure 6A:
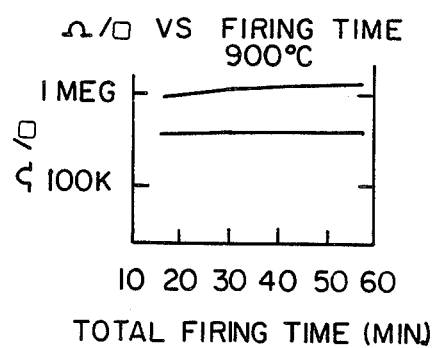
FIG. 6A shows the effect of total firing times at 900° C. on sheet resistivity in ohms per square.
Figure 6B:
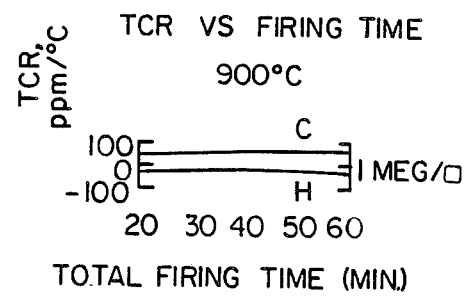
FIG. 6B shows the effect of total firing time at 900° C. on TCR in ppm/°C.

FIGS. 6A and 6B show the effect of firing time in minutes on sheet resistivity and TCR.

FIG. 6A shows that variations in firing time from 20 through 60 minutes did not radically change the sheet resistivity.

FIG. 6B shows the TCR's remain well within ±100 ppm/°C. regardless of a variation in total firing time from 20 to 60 minutes.

Figure 7A:
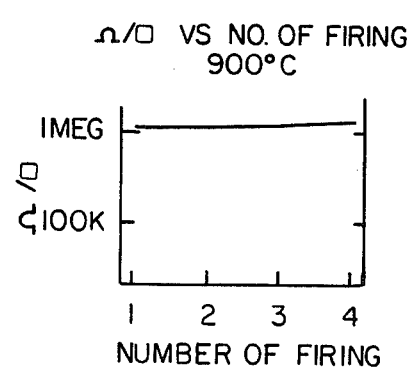
FIG. 7A shows the effect of a number of firings at 900° C. on sheet resistivity in ohms per square.
Figure 7B:
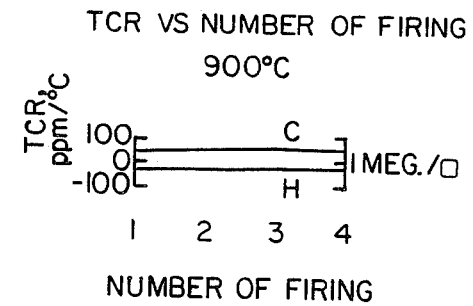
FIG. 7B shows the effect of a number of firings at 900° C. on TCR in ppm/°C.

FIGS. 7A and 7B show the effect of the number of firings on sheet resistivity and TCR.

FIG. 7A shows the sheet resistivity remains within ±10% after four firings. FIG. 7B shows that the TCR remains well within ±100 ppm/°C., after four firings.

Thus, it can be seen that the resistor paint herein disclosed is ideally suited to a variety of processing conditions, and remains relatively unaffected by firing temperature, firing time, belt speed and the number of firings.

Another significant advantage of the disclosed resistor paint is low current noise. Base metal resistors typically generate more current noise than comparable precious metal resistors. Reference is made to the two articles published in the Symposium of International Society of Hybrid Microelectronics in 1982. Current noise typically increases with an increase in sheet resistivity. Current noise of resistive paints in the megohm range is generally much higher than resistive paints in the 100K range.

The resistive paint disclosed herein exhibits a relatively lower current noise. In fact, the current noise of megohm resistive paints disclosed herein exhibit comparable or improved noise levels over the noise levels of megohm ruthenium based resistors.

Current noise is strongly dependent upon the geometry of resistors. The inventor of the resistor paints disclosed herein has introduced a noise constant which is independent of resistor geometry and represents the noise index value of a resistor material of unit volume (dB/mil$^3$ or dB/mm$^3$). Noise constant=Noise index +10 log volume. The more negative dB means less noise in the resistor.

The noise constant of the present megohm/square resistors average 12 dB per mil$^3$, as compared to 55 dB per mil$^3$ for palladium resistors and 40 dB per mil$^3$ for ruthenium based resistor systems. Thus it can be seen that the current noise of the megohm resistors disclosed herein are even less than the current noise of noble metal resistors.

Another important factor in processing thick film resistors made from resistor paints is laser trimability. Samples of resistors made as disclosed herein were laser trimmed using a Chicago Laser Model CLS 35 50W YAG laser. The trimming parameters were 0.75" to 1.25" per second trim speed, with a Q-rate of 4 Khz pulse frequency, and a 3-watt beam power. The increase in sheet resistivity was 20–40%. The resistance change after trimming was less than 0.2% for megohm per square sheet resistivity, which is comparable with ruthenium based resistors.

A short time overload (STOL) was conducted using resistors made with the disclosed resistor paints. A short time overload of 2.5 times the rated voltage, or 5 watts for 5 seconds, but not over 500 volts, was used. Test results indicated that resistance change after STOL for resistors disclosed herein is generally less than 0.25% which meets most stringent requirements.

Figure 3:
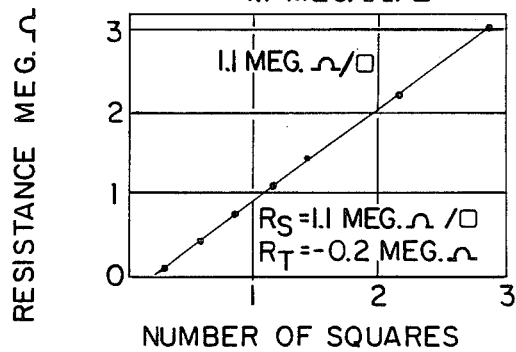
FIG. 3 shows a chart of the effects geometry factors on resistors, comparing the effect of the number of squares on sheet resistance in the megohms range.

The effect of geometry on resistors made as disclosed herein is shown in FIG. 3. The results show that the effect of geometry on these resistors is low.

A temperature cycle test was run from −65° C. to 150° C. for 100 cycles. The average resistance change of resistors made with the disclosed resistor paint was less than 0.1%.

The absence of precious metals in the disclosed resistor paint results in significant cost savings. Therefore, while this invention has been described with reference to a particular embodiment, it is to be understood that modifications may be made without departing from the spirit of the invention, or from the scope of the following claims.

INDUSTRIAL APPLICABILITY

This invention discloses a base metal resistive paint for subsequent screening upon a substrate and firing to make a base metal thick film resistor for use in an electronic circuit.

I claim:

1. A base metal, resistive composition, which comprises:
   a base metal powder coated with a resinate solution selected from at least one of a manganese resinate solution and a tantalum resinate solution, the resinate coated powder prefired in air, then reduced in a reducing atmosphere to form a pre-reacted powder therefrom;
   a glass frit;
   a screening agent; and
   two to twelve percent of an oxide of hafnium, well mixed with the pre-reacted powder, the glass frit and the screening agent to form the composition having a sheet resistivity selected from a range of 500,000 ohms to five megohms per square, when screened upon a substrate and fired in an inert atmosphere to form a base metal resistor therefrom.

2. The composition of claim 1, wherein the glass frit comprises 2 to 10 percent SiO$_2$ powder, 20 to 40 percent SrO powder, and 50 to 70 percent B$_2$O$_3$ powder, said powders mixed and melted prior to grinding to form the glass frit therefrom.

3. The composition of claim 2, wherein 60 to 80 percent of the glass frit is blended with 20 to 40 percent tantala oxide and melted prior to grinding to form a tantala glass frit therefrom.

4. The composition of claim 1, wherein the resinate solution comprises less than 30 percent resinate metals therein.

5. The composition of claim 1, wherein the base metal powder is a tin oxide powder.

6. The composition of claim 1, wherein the resinate coated base metal powder is fired in a reducing atmosphere at 450°–520° C. to form the pre-reacted conductive powder.

7. The composition of claim 1, in which depolymerizable organics are burned out of the resinate solution coated on the base metal powder, prior to firing.

8. The composition of claim 1, wherein the hot and cold TCR is controllably held within ±200 ppm/°C.

9. A thick film, base metal resistor formed by screening a resistive paint upon a substrate and firing in an inert atmosphere, which comprises:
   a tin oxide powder coated with a resinate solution, the resinate solution selected from at least one of a manganese resinate solution and a tantalum resinate solution, the resinate solution having less than 30% resinate metal therein; the resinate coated base metal powder prefired in air, then reduced in a reducing atmosphere to form a pre-reacted base metal powder therefrom;
   a glass frit comprising 2 to 10 percent SiO$_2$, 20 to 40 percent SrO, and 50 to 70 percent B$_2$O$_3$ powders mixed and melted prior to grinding; 60 to 80 percent of the glass frit blended with 20 to 40 percent tantala oxide to form a tantala glass frit therefrom;
   a screening agent; and from two to twelve percent of an oxide of hafnium;
wherein the pre-reacted base metal powder, the tantala glass frit, the screening agent and the oxide of hafnium are well mixed to form a resistive composition suitable for screening upon a substrate and firing in a reducing atmosphere to form the base metal resistor exhibiting a sheet resistivity selected from the range of 500,000 ohms to 5 megohms per square.

10. The resistor of claim 9, wherein the resinate coated base metal powder is prefired in a reducing atmosphere at 450°–520° C. prior to forming the pre-reacted conductive powder.

11. The resistor of claim 9, wherein the screened substrate is fired in an inert atmosphere at 900° C.±20° C.

12. The resistor of claim 9, wherein the hot and cold TCR is controllably held within ±°200 ppm/°C.

13. A base metal, resistive composition, which comprises:

a tin oxide powder coated with a resinate solution selected from at least one of a manganese resinate solution and a tantalum resinate solution, to form a pre-reacted tin oxide powder therefrom;

a tantala glass frit comprising 20 to 40 percent $Ta_2O_5$ powder with the remaining 60 to 80 percent powder comprising a mixture of 2 to 10 percent $SiO_2$; 20 to 40 percent SrO; 50 to 70 percent $B_2O_3$ mixed and melted prior to grinding; and from 2 to 12 percent of an oxide of hafnium;

the base metal resistive composition suitable for screening upon a substrate and firing in an inert atmosphere to form a resistive paint exhibiting a sheet resistivity selected from the range of 500,000 ohms to 5 megohms per square, and a TCR within ±200 ppm/°C.

14. The composition of claim 13, wherein the resinate solution comprises less than 30 percent resinate metals therein.

* * * * *